United States Patent
Abello (10) Patent No.: US 7,086,712 B2
(45) Date of Patent: Aug. 8, 2006

(54) HALFTONING METHOD AND APPARATUS

(75) Inventor: Lluis Abello, Barcelona (ES)

(73) Assignee: Hewlett-Packard Development Company, L.P, Houston, TX (US)

( * ) Notice: Subject to any disclaimer, the term of this patent is extended or adjusted under 35 U.S.C. 154(b) by 306 days.

(21) Appl. No.: 10/209,333

(22) Filed: Jul. 30, 2002

(65) Prior Publication Data

US 2004/0021720 A1 Feb. 5, 2004

(51) Int. Cl.
*B41J 2/205* (2006.01)

(52) U.S. Cl. .......................... 347/15; 358/1.9
(58) Field of Classification Search ............ 347/15, 347/43, 19, 14; 358/1.2, 1.9, 521, 534, 1.6, 358/1.17, 502, 536
See application file for complete search history.

(56) References Cited

U.S. PATENT DOCUMENTS

| | | | | |
|---|---|---|---|---|
| 5,835,108 A | | 11/1998 | Beauchamp et al. | 347/19 |
| 5,892,851 A | * | 4/1999 | Nguyen | 382/252 |
| 6,072,590 A | * | 6/2000 | Sano et al. | 358/1.9 |
| 6,637,851 B1 | * | 10/2003 | Velde et al. | 347/15 |

* cited by examiner

*Primary Examiner*—Lamson Nguyen (57) ABSTRACT

A method of halftoning monochrome contone image data with a color pixel processor, the processor being arranged to halftone substantially simultaneously a plurality of image data corresponding to a plurality of different colors, the method comprising the step of: halftoning substantially simultaneously a plurality of monochrome image data corresponding to a plurality of separate pixel positions of a print job.

37 Claims, 6 Drawing Sheets

HALFTONING METHOD AND APPARATUS

FIELD OF THE INVENTION

The present invention relates generally to methods and apparatus for processing and printing digital images, particularly but not exclusively, using inkjet printing technology

BACKGROUND OF THE INVENTION

A digital printer generally requires a pixel processing unit to perform various operations on the raster data, or original image data, prior to printing an image. These processes may include scaling, linearization and halftoning, amongst others.

The process of halftoning, for example, is used to generate a halftone image, which consists of a selectively positioned arrangement of dots of fixed tone levels. This arrangement creates the illusion of a continuous tone, or "contone", image. Thus, halftoning is a process that allows a continuous tone image to be modified in order that it may be represented by a device that can only represent a finite number of tone levels.

Various halftoning methods have been devised. Initially, "dithering" or matrix-based techniques were used to halftone images. In such techniques, a two-dimensional array of values is mapped over a continuous tone image. The data in each pixel in the continuous tone image is compared to the matrix value for that pixel. If the continuous tone value is greater than the matrix value, then a dot is printed in the corresponding position in the halftone image. More recent refinements to the halftoning process include "error diffusion" type halftoning processes. Error diffusion halftoning is a neighbourhood process. That is to say, when determining whether or not to print a pixel in a halftone image, the value of the corresponding pixel in the continuous tone image is considered together with information pertaining to pixels neighbouring that pixel. Such processes often give rise to halftone images with reduced grain compared to images produced by dithering or matrix-based techniques.

Modem inkjet devices and printing methods usually employ considerable processing power to carry out such pixel processing. Nevertheless, the time required to process print data prior to printing an image is often appreciable. In turn, this required processing time may adversely affect the throughput of the printer. At the same time, the importance placed on the throughput of inkjet printers has risen dramatically over recent years. Consequently, manufacturers have embarked on a process of continually improving their inkjet devices to give improved throughput in order to secure a competitive edge in the marketplace.

It would therefore be desirable to provide method and apparatus which allows at least some images to be processed prior to printing in a manner which allows the throughput of the printer to be increased.

SUMMARY OF THE INVENTION

According to a first aspect of the present invention there is provided a method of halftoning monochrome contone image data with a colour pixel processor, the processor being arranged to halftone substantially simultaneously a plurality of image data corresponding to a plurality of different colours, the method comprising the step of: halftoning substantially simultaneously a plurality of monochrome image data corresponding to a plurality of separate pixel positions of a print job.

Conventionally, colour printers halftone each of the colour planes of a contone image simultaneously, since the input raster image is stored as an interleaved format. In a four colour system (e.g. KCMY) for example, a 32 bit word may define one colour pixel using 8 bits per colour. When the same colour printer is used to print a monochrome or black and white image, the monochrome input raster images are stored as a stream of 8 bit K (or black) values, which contain a quarter of the data contained compared to a four colour image. However, monochrome raster images are halftoned at the same pixel rate as colour images, leading to inefficient use of the processing power of the ASIC (application specific integrated circuit) used to carry out the halftoning process. By simultaneously halftoning a plurality of monochrome image data, or pixels, in a monochrome image, the efficiency of the monochrome halftoning process in a colour printer may be increased. In turn, this allows printing speeds to be increased.

Preferably, the number of monochrome pixels which are simultaneously halftoned is equal to the number of colours which the colour pixel processor is arranged to halftone simultaneously when halftoning a colour image. For example, in a four colour printer system (e.g. KCMY), four monochrome pixels may be simultaneously halftoned. This allow a monochrome image to be halftoned approximately four times as fast as in a conventional colour printer system.

In one embodiment, pixels belonging to different pages of a print job are simultaneously halftoned. In this manner, multiple pages of a print job may be simultaneously halftoned In another embodiment, separate pixels from the same page of a print job are simultaneously halftoned. This method benefits from the advantage of reduced latency. Thus, in cases of print jobs which have less pages than the maximum number of pixels which may be simultaneously halftoned, the throughput of the system may be increased relative to the embodiment in which pixels from different pages are simultaneously halftoned. This embodiment may be particularly useful for printers systems, for example a copier with an inkjet based print engine, where a low number of pages are frequently required to be scanned and printed rapidly.

Preferably, the monochrome contone data is ordered prior to halftoning. In so doing, the time required to halftone the print data may be further reduced Furthermore, in this manner the change between halftoning colour and monochrome print data may be transparent to the pixel processing unit, such as an ASIC. This offers the advantage of allowing a conventional colour pixel processing unit to be used in embodiments of the present invention without the need to implement expensive modifications in the halftoning ASIC or ASICs.

The present invention also extends to the apparatus corresponding to the claimed methods. Furthermore, the present invention also extends to a computer program arranged to implement the methods of the present invention.

Other aspects and advantages of the present invention will be apparent from the following detailed description, together with the accompanying drawings.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE INVENTION

There will now be described by way of example only the best modes contemplated by the inventors for carrying out the invention.

First Embodiment

Figure 1:
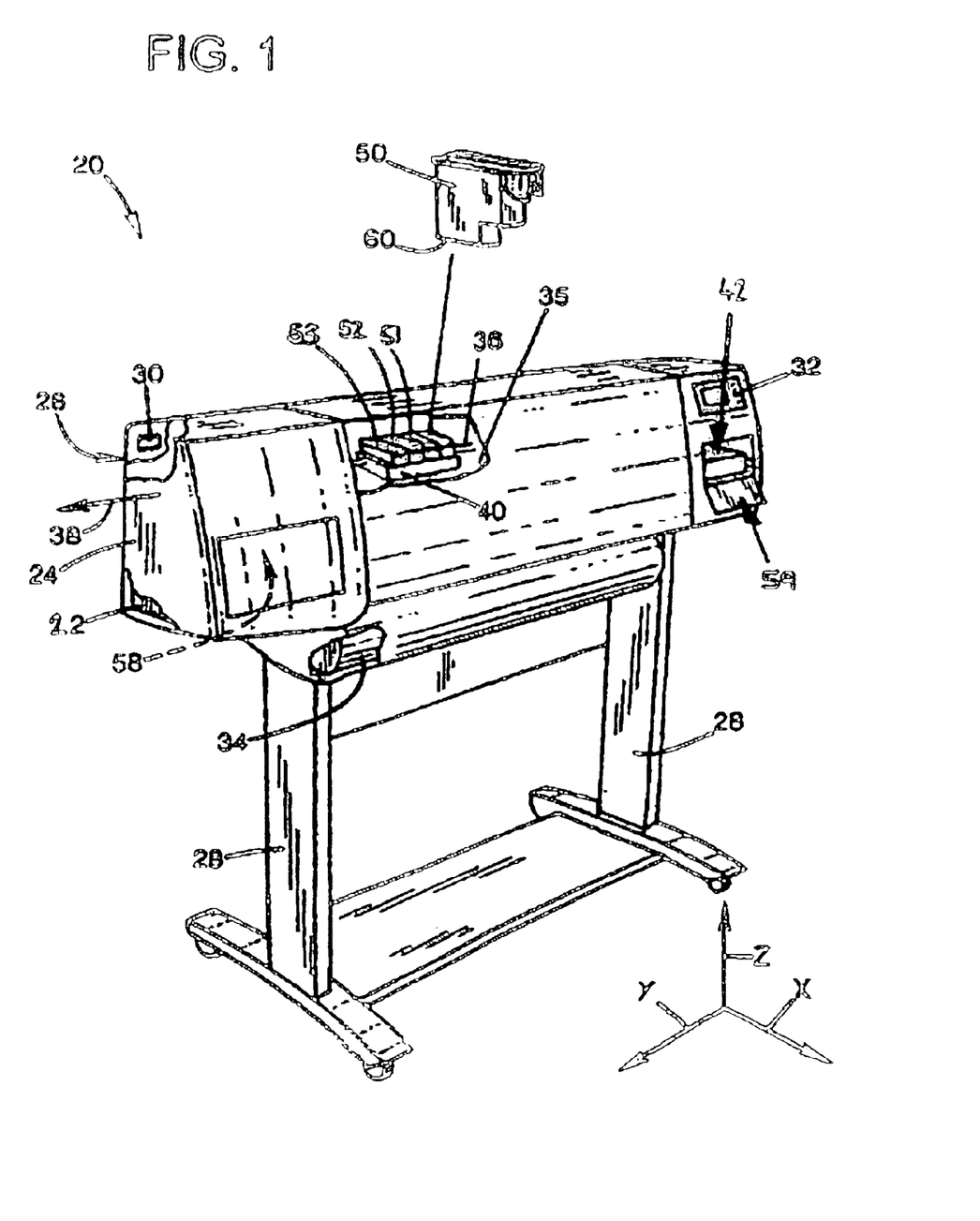
FIG. 1 illustrates an ink jet printer arranged to implement embodiments of the present invention.

FIG. 1 illustrates an embodiment of an inkjet printing mechanism, here shown as an inkjet printer 20, which is suitable for use with the present invention. The printer 20 may be used for printing conventional engineering and architectural drawings, as well as high quality poster-sized images, and the like, in an industrial, office, home or other environment. A variety of inkjet printing mechanisms are commercially available. Examples of printing mechanisms that may embody the present invention include large format printers, office and desk top printers, copiers, and facsimile machines, to name a few. For convenience the concepts of the present invention are illustrated in the environment of large format inkjet printer 20. Commonly assigned U.S. Pat. No. 5,835,108, entitled "Calibration technique for misdirected inkjet printhead nozzles", describes an exemplary system which can employ aspects of this invention and the entire contents of which are incorporated herein by reference.

While it is apparent that the printer components may vary from model to model, the typical inkjet printer 20 includes a chassis 22 surrounded by a housing or casing enclosure 24, typically of a plastic material, together forming a print assembly portion 26 of the printer 20. Although the print assembly portion 26 may be supported by a desk or tabletop, it is preferred to support the print assembly portion 26 with a pair of leg assemblies 28.

The printer 20 also has a printer controller, illustrated schematically as a microprocessor 30 that receives instructions from a host device, which is typically a computer, such as a personal computer or a computer aided drafting (CAD) computer system (not shown). The printer controller 30 may also operate in response to user inputs provided through a key-pad and status display portion 32, located on the exterior of the casing 24. The printer controller 30 has associated memory (not shown), which may include ROM, RAM and a non-volatile data storage module, such as a high capacity hard disk drive. In this manner, image data to be printed may be stored when it is downloaded from a host device. The printer controller 30 may then process the print data as described in the method of the present embodiment and store the processed print data once again prior to the printing of the image.

A monitor coupled to the computer host may also be used to display visual information to an operator, such as the printer status or a particular program being run on the host computer. Personal and drafting computers, their input devices, such as a keyboard and/or a mouse device, and monitors are all well known to those skilled in the art.

A conventional print media handling system (not shown) may be used to advance a pre-cut sheet or a continuous sheet of print media 34 from a roll through a print zone 35. The print media 34 may be any type of suitable sheet material, such as paper, poster board, fabric, transparencies, Mylar™, and the like.

A carriage guide rod 36 is mounted to the chassis 22 to define a scanning axis 38, with the guide rod 36 slideably supporting an inkjet carriage 40 for travel back and forth, reciprocally, across the printzone 35. A conventional carriage drive motor (not shown) may be used to propel the carriage 40 in response to a control signal received from the controller 30. To provide carriage positional feedback information to the controller 30, a conventional encoder strip (not shown) may be extended along the length of the printzone 35 and over the servicing region 42, which is accessible to the user via access panel 59.

In the printzone 35, the media sheet receives ink from an inkjet cartridge, such as a black ink cartridge 50, an enlarged view of which is shown in FIG. 1, and three monochrome color ink cartridges 51 to 53. Each of the cartridges, often called "pens" by those in the art, is mounted on the inkjet carriage 40. In the present embodiment, the cartridges 51 to 53 are each arranged to print one of the following colour inks: cyan; magenta; yellow. In the present embodiment, each of the pens 50 to 53 contains dye-based ink although pigment based ink could alternatively be used.

The illustrated pens 51 to 53 each have a printhead (of which only printhead 60 of the pen 50 is illustrated in the figure), which selectively ejects ink to form an image on a sheet of media 34 in the printzone 35. Each printhead has an orifice plate with a plurality of nozzles formed therethrough in a manner well known to those skilled in the art. The nozzles of each orifice plate are typically formed in at least one, but typically two generally linear arrays along the orifice plate. These inkjet printheads have a large print swath (i.e. the height of the band of a ink that may be printed in one pass of the printhead), for instance about 20 to 25 millimeters (about one inch) wide or wider, although inkjet printheads having larger or smaller print swaths may also be used.

The illustrated printer 20 uses an "off-axis" ink delivery system, having main stationary reservoirs (not shown) for each ink color located in an ink supply region 58. In this off-axis system, the pens 50–53 may be replenished by ink conveyed through a conventional flexible tubing system (not shown) from the stationary main reservoirs. In this manner, only a small ink supply is propelled by carriage 40 across the printzone 35, which is located "off-axis" from the path of printhead travel.

In the present embodiment, the printheads are thermal inkjet printheads, although other types of printheads may be used, such as piezoelectric printheads. The thermal printheads typically include a plurality of resistors associated with the nozzles. Upon energizing a selected resistor, a bubble of gas is formed which ejects a droplet of ink from the nozzle and onto a sheet of media in the print zone 35 under the nozzle. The printhead resistors are selectively energized in response to firing command control signals delivered from the controller 30 to the printhead carriage 40.

Figure 2:
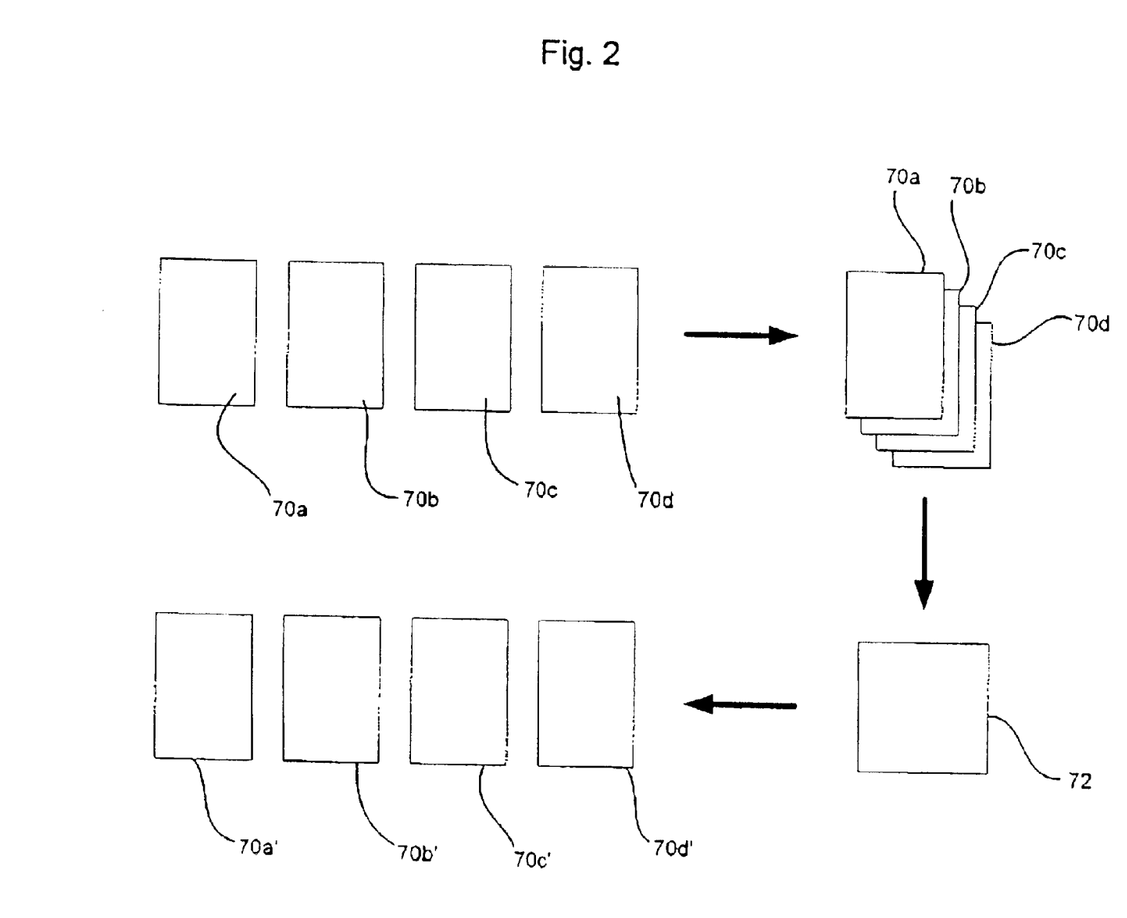
FIG. 2 is a schematic diagram illustrating the method of a first embodiment of the invention, FIGS. 3a–c schematically illustrate the halftoning process of a first embodiment of the invention.

Referring to FIG. 2, a schematic diagram illustrating the method of the first embodiment of the invention is shown.

As can be seen from the figure, four individual pages 70a–70d of continuous tone (or contone) monochrome print data are grouped together. The four pages of print data are then halftoned substantially simultaneously using a colour pixel processing unit 72. In the present invention, the colour pixel processing unit 72 forms a part of the printer controller 30. Alternatively, however, the colour pixel processing unit 72 may be implemented as a separate processing device. In either case, the colour pixel processing unit 72 may be of conventional type and operation. The colour pixel processing unit 72 outputs four individual pages 70a'–70d' of halftoned (or halftone) monochrome print data. The pages 70a'–70d' correspond respectively to the contone pages 70a–70d.

The process of the first embodiment will now be described in more detail with reference to FIGS. 3a–c.

Figure 3A:
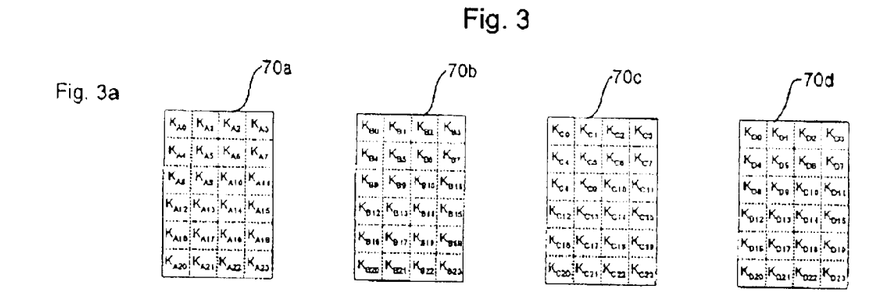

FIG. 3a schematically illustrates the four pages 70a–70d of continuous tone (or contone) monochrome print data shown in FIG. 2. In the present embodiment, adjacent contone values belonging to the same page 70a–d are stored in contiguous memory (such as DRAM) addresses associated with the printer controller 30. However, the skilled reader will appreciate that the monochrome contone values of each of the pages 70a–d may be stored in any suitable manner.

In this illustrative example, for ease of explanation, the individual print data values making up each of the pages 70a–70d are illustrated in positions corresponding to the positions in which they will be printed on a page or a sheet of print media. Thus, as can be seen from the figure, each of the pages 70a–70d of print data is made up of 24 pixel locations arranged in a rectangle, with a width of 4 pixels and a height of 6 pixels, i.e. each of the pages 70a–70d has four pixel columns and 6 pixel rows. For example, the values making up page 70a of print data are referenced $K_{A0}$ to $K_{A23}$. The values $K_{A0}$ to $K_{A23}$ are numbered sequentially left to right and then top to bottom across the page and represent the continuous tone monochrome (such as black or K) values of the corresponding pixel locations in the image to be printed on the page.

The values making up each of pages 70b–70d are referenced as $K_{B0}$ to $K_{B23}$, $K_{C0}$ to $K_{C23}$, and $K_{D0}$ to $K_{D23}$, respectively. In each case, the values are numbered sequentially left to right and then top to bottom across the page.

In the present embodiment each of the monochrome contone values of each of the pages 70a–d, for example $K_{A0}$ to $K_{A23}$, is an 8 bit value, giving rise to 256 possible contone levels. However, any suitable contone scheme may instead be used in other embodiments of the invention.

Prior to halftoning the contone data, the colour pixel processing unit 72 reads the stored values of each of the 24 pixel locations of each of the pages 70a–d and writes the read values to further memory addresses. This is carried out as schematically illustrated by the data structure 70e in FIG. 3b.

As can be seen from the figure, the contone values corresponding to the pages 70a–d are reordered in this process. The contone values are reordered such that contone values of corresponding position in each of the pages 70a–d are stored in adjacent memory addresses. Thus, for example, the contone values $K_{A0}$, $K_{B0}$, $K_{C0}$ and $K_{D0}$, each of which correspond to the row 1, column 1 position of their respective pages, are written to adjacent memory locations in that order; i.e. $K_{A0}$, $K_{B0}$, $K_{C0}$ and $K_{D0}$. The contone values $K_{A1}$, $K_{B1}$, $K_{C1}$ and $K_{D1}$, which correspond to the row 1, column 2 position of their respective pages are then stored in that order in the memory address continuing on from that in which the value of $K_{D0}$ was stored. In the present embodiment, the contone values of corresponding position between the pages 70a–d are always stored in the same order; i.e. that of the pages 70a, 70b, 70c and 70d. However, the skilled reader will appreciate that in other embodiments of the invention, this need not necessarily be the case. This process is continued in the same manner with the contone values which correspond to the row 1, column 3 position and then the row 1, column 4 position of their respective pages. The process then continues in the same manner with the next row of the respective pages; i.e. in the contone values $K_{A4}$, $K_{B4}$, and $K_{C4}$ which correspond to the row 2, column 1 position of their respective pages. The value $K_{A4}$ is in the memory address adjacent to that in which the value of $K_{D3}$ was stored. Thus, the first 20 contiguous memory addresses of the reordered contone values hold the following values:

$K_{A0}$, $K_{B0}$, $K_{C0}$, $K_{D0}$, $K_{A1}$, $K_{B1}$, $K_{C1}$ $K_{D1}$, $K_{A2}$, $K_{B2}$, $K_{C2}$, $K_{D2}$, $K_{A3}$, $K_{B3}$, $K_{C3}$, $K_{D3}$ $K_{A4}$, $K_{B4}$, $K_{C4}$ and $K_{D4}$ This reordering process is continued until the final row/column positions of the pages 70a–d have been reordered in the same manner; in this example, $K_{A23}$, $K_{B23}$, $K_{C23}$ and $K_{D23}$. For the sake of clarity, reordered values lying between $K_{D4}$ and $K_{A23}$ have not been shown in FIG. 3b. It will also be noted that in FIG. 3b, the reordered contone values are illustrated on different rows of the figure. However, it will be understood that this is merely for ease of representation.

Figures 3B, 3C:
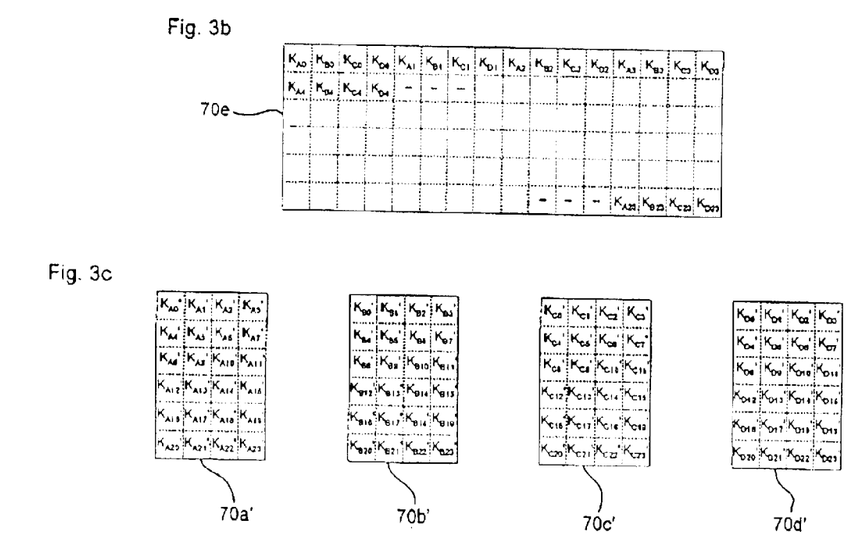
Figure 4:
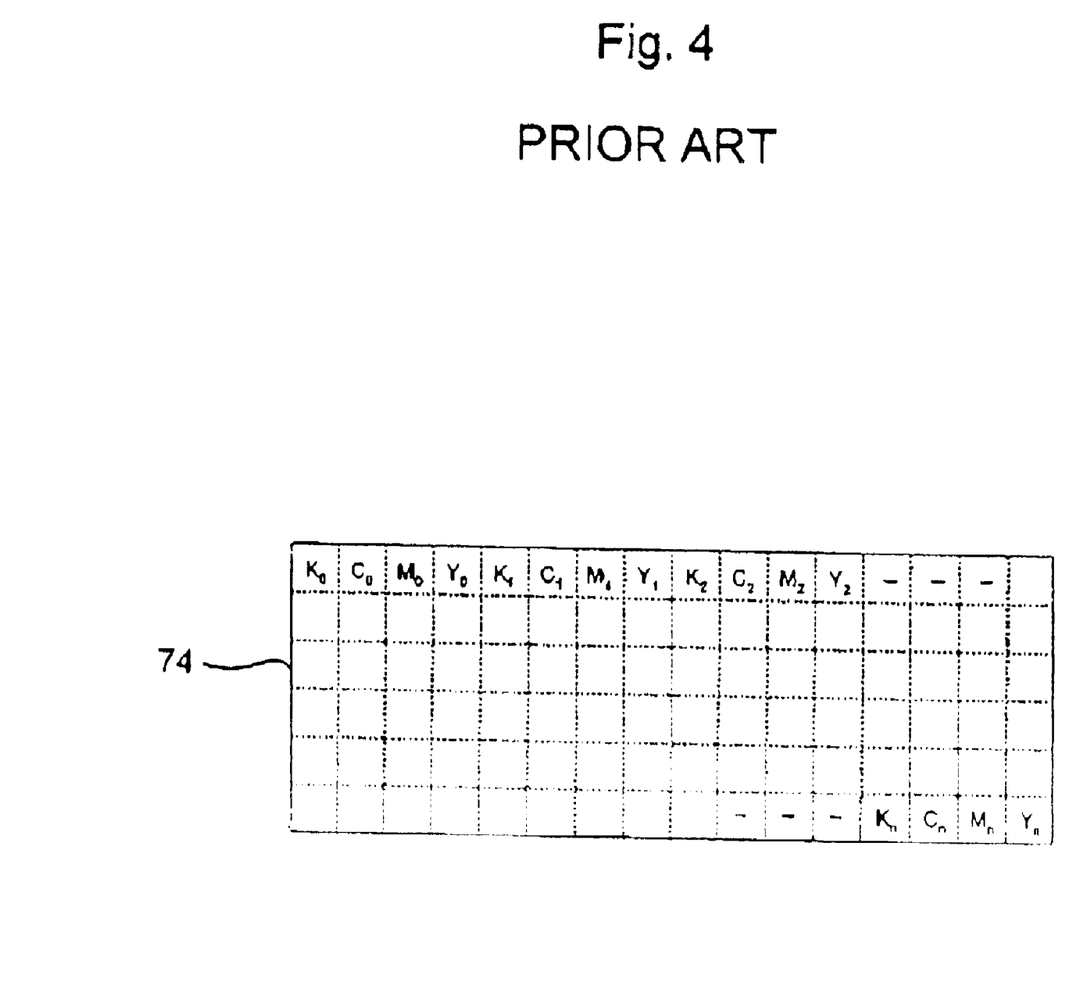
FIG. 4 schematically illustrates a prior art print data structure.

The data structure 70e shown in FIG. 3b now partially resembles a conventional data structure employed for storing contone data for a four colour (e.g. CMKY) image prior to being halftoned. FIG. 4 illustrates such a conventional data structure 74. As can be seen from the figure, in this type of data format, sometimes known as "interleaved" or "pixel major" format, the CMYK values of each pixel in an image to be printed is stored as a 32 bit data word. The 32 bit data word corresponds to four lots of 8 data bits, where each data bits corresponds to the C, M, Y or K value for the pixel in question. Thus, the values of $K_0$, $C_0$, $M_0$ and $Y_0$, shown in FIG. 4, together may define the colour for the pixel at position row 1, column 1 of a given colour page. The colour for the adjacent pixel at position row 1, column 2 of a colour page may then be defined by the values of $K_1$, $C_1$, $M_1$ and $Y_1$, which are stored at memory addresses continuing on from that in which the value of $Y_0$ was stored. In this manner, the entire colour image, up to pixel "n" defined by data word $K_n$, $C_n$, $M_n$, and $Y_n$, may be stored using 32 bit data words to define each pixel. Thus, it will be understood that in this data format, the colour raster data of the different colour planes are stored in memory in an interleaved manner.

Conventionally, colour pixel processing units halftone all of the colour raster data corresponding to a given pixel position simultaneously. That is to say that all colour planes are halftoned simultaneously. This is achieved by reading a 32 bit data word such as $K_0$, $C_0$, $M_0$ and $Y_0$, shown in FIG. 4 and processing the four (C,M,Y,K) 8 bit values in parallel. In this process, the pixel depth is usually reduced to 1, 2 or 3 bits per pixel for each colour.

The resultant halftone data is then output according to its colour to a corresponding number of colour planes. Thus, for example, the values of $K_0$, $C_0$, $M_0$ and $Y_0$ shown in FIG. 4, once halftoned, are stored respectively in K, C, M and Y colour planes. The halftone values corresponding to $K_0$, $C_0$, $M_0$ and $Y_0$ are stored in their respective colour planes in positions that correspond to the row/column position of the pixel defined by the data word $K_0$, $C_0$, $M_0$ and $Y_0$; i.e. in this example position row 1, column 1 of the colour page. This means that all adjacent pixels of the same colour are stored in a consecutive memory (for example DRAM) addresses. This format is often known as planar format.

In the present embodiment, when the halftoning process commences, the colour pixel processing unit reads in the first 32 bit contone data word shown in FIG. 3b (i.e. $K_{A0}$, $K_{B0}$, $K_{C0}$, $K_{D0}$) in a conventional manner. The colour pixel processing unit then proceeds to halftone each of the 8 bit values $K_{A0}$, $K_{B0}$, $K_{C0}$, $K_{D0}$ in parallel in the normal manner. In the present embodiment this is achieved using a conventional non-plane dependent halftoning process. The four 8 bit contone values $K_{A0}$, $K_{B0}$, $K_{C0}$, $K_{D0}$ do not belong to the same image or page but separate pages 70a–d. Consequently, it is preferable to use a halftoning process which does not introduce dependency between separate colour planes as is sometimes implemented in colour halftoning processes; since this would introduce a dependency between the pages 70a–d in the present embodiment.

Suitable types of halftoning process for use in the present embodiment may include conventional dither or matrix based or non-plane dependent error diffusion type halftoning processes. Such techniques are well known and understood in the art. Various well known techniques, such as the Floyd-Steinberg methods are suitable for use in the present embodiment The result of this halftoning step is four halftone values $K_{A0}'$, $K_{B0}'$, $K_{C0}'$, $K_{D0}'$, which respectively correspond to the contone values $K_{A0}$, $K_{B0}$, $K_{C0}$, $K_{D0}$. The halftone values are output by the colour pixel processing unit 72 and stored in a conventional manner, as has been described above with respect to the conventional colour halftoning processes. In this manner, the four halftone values $K_{A0}'$, $K_{B0}'$, $K_{C0}'$, $K_{D0}'$ are each stored conventionally in planar format and in separate planes. These planes are repectively 70a', 70b', 70c' and 70d', each of which is schematically illustrated in FIG. 3c. Each of the four halftone values $K_{A0}'$, $K_{B0}'$, $K_{C0}'$, $K_{D0}'$ are stored in a position in their respective plane which corresponds to the position which their corresponding contone value $K_{A0}$, $K_{B0}$, $K_{C0}$, $K_{D0}$ occupied in their respective page 70a–d. Again, this is as is conventional when implementing colour halftoning processes. In this example, each of the four halftone values $K_{A0}'$, $K_{B0}'$, $K_{C0}'$, $K_{D0}'$ are stored at a memory location which corresponds to the row 1, column 1 of their respective planes 70a', 70b', 70c' and 70d' as can be seen from FIG. 3c.

The colour pixel processing unit 72 subsequently reads in the next 32 bit contone data word shown in FIG. 3b (i.e. $K_{A1}$, $K_{B1}$, $K_{C1}$, $K_{D1}$). The halftoning, outputting and storing processes are then repeated in respect of the next 32 bit contone data word ($K_{A1}$, $K_{B1}$, $K_{C1}$, $K_{D1}$) as was described above with respect to the first 32 bit contone data word. As can be seen from FIG. 3c, the four resultant halftone values $K_{A1}'$, $K_{B1}'$, $K_{C1}'$, $K_{D1}'$ are stored at a memory location which corresponds to the row 1, column 2 of their respective planes 70a', 70b', 70c' and 70d'.

This halftoning process is then continued until each of the remaining 32 bit contone data words is similarly processed and the halftone planes 70a', 70b', 70c' and 70d' are complete, as is shown in FIG. 3c. At this stage, the colour pixel processing unit 72 may then proceed to halftone a further pages of contone data, in a conventional manner.

The skilled reader will appreciate that the completed halftone planes 70a–d each contains complete monochrome halftone print data corresponding to its associated contone page 70a–d.

Thus, whereas in a colour system, it is necessary to print the four colour planes of halftone data (KCMY) in a superimposed manner in order to generate a complete image, this is not the case in the present embodiment. In the present embodiment, each of the halftone planes 70a–d may be individually printed using any conventional method as will be well understood by the skilled reader.

However, in order to increase the throughput of the printer, in the present embodiment, the printer controller 30 is adapted to immediately instigate the sequential printing of each of the images.

It will thus be understood that the method of the present embodiment allows up to four monochrome pages to be halftoned in parallel, providing significant throughput advantages over previously known monochrome halftoning techniques using colour printer processing technology.

It will also be understood that the present embodiment may be implemented using a pixel processing unit 72 that is arranged to simultaneously process a different number of planes to four, as was described in the present embodiment. For example, six plane systems arranged to simultaneously halftone black, cyan, magenta, yellow, light cyan and light magenta colour planes may be implemented. Alternatively systems having two, three, five, seven or eight (or indeed more) colours may also be used. In such cases, it will be clear to the skilled reader that the present embodiment may be adapted to take advantage of the extra parallel halftoning processing power of such a halftone processor. This may be achieved by increasing the number of pages of monochrome data that are simultaneously halftoned to equal the number of separate colour planes that the halftone processor is arranged to handle.

It will be further understood, however, that the present embodiment may also be used to simultaneously halftone any intermediate number of monochrome pages. For example, in the case of the present embodiment, in which the colour pixel processing unit is arranged to process four colours, between one and four pages of monochrome print data may be simultaneously halftone, i.e. two or three pages but in particular two. By halftoning two pages of monochrome print data simultaneously, a speed increase of factor of two relative to halftoning one page at a time may be achieved. However, since only two pages are required in order to start the pixel processing unit, this option involves less latency that is the case when four monochrome pages are combined.

It will be further understood that the present embodiment may be implemented allowing the user to select what degree of trade-off between latency and throughput is required for a given situation. This may be achieved, for example though the use of a manual user input via the printer control panel for example. Alternatively, the controller of the printer may be programmed to automatically select the trade off between latency and throughput in dependence upon selected variables. Such variable could include for example, the number of pages of a print job and the length of the print queue, amongst others Second Embodiment The second embodiment employs substantially the same apparatus as described with reference to the first embodiment. Therefore, like functions and structures will not be described further in detail. However, whereas the first embodiment achieves increased throughput in monochrome printing by halftoning multiple pages at the same time, the second embodiment achieves a similar goal by halftoning multiple portions or areas of the same page at the same time. The method of the second embodiment will now be described with reference to FIGS. 5 and 6.

Figure 5:
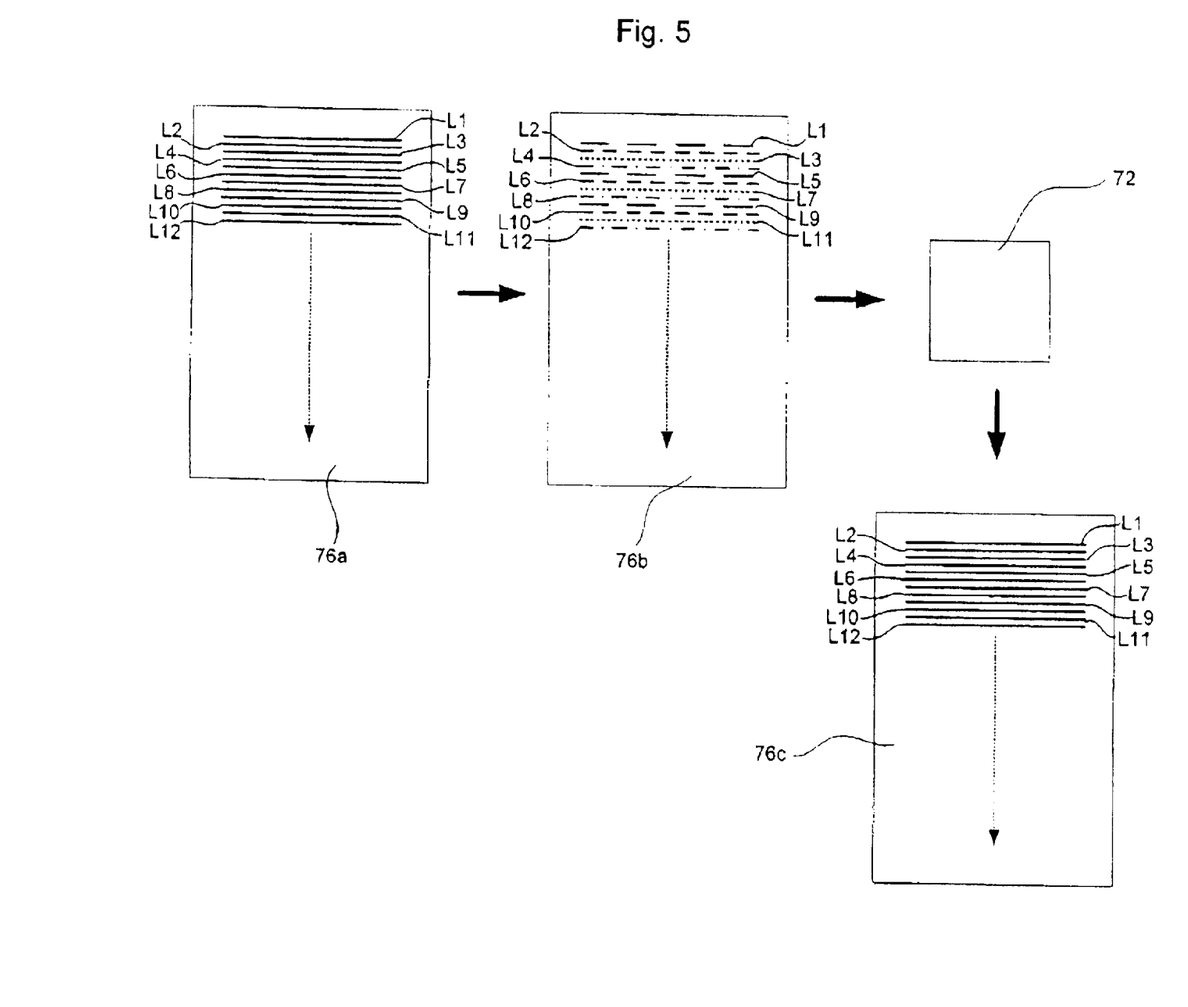
FIG. 5 is a schematic diagram illustrating the method of a second embodiment of the invention.

Referring to FIG. 5, a schematic diagram illustrating the method of the second embodiment of the invention is shown. In the figure, a single page 76a of continuous tone (or contone) monochrome print data is schematically illustrated. For ease of explanation, this is illustrated as it should appear when printed. As is shown, the page 76a contains a number of lines of monochrome contone print data. Twelve lines of print data are illustrated in the figure. These are sequentially referenced L1–L12. However, the page may contain less or more lines as is indicated by the dotted arrow on the page 76a.

In the present embodiment, the contone data making up the individual lines L1–L12 are grouped into logical sets, as schematically illustrated in page 76b, also shown in the figure. The lines are grouped into four sets for separate processing. In the present embodiment, each of the four sets are processed by different halftoning processing hardware. In the present embodiment, the lines of each of the sets are interleaved. Thus, lines L1, L5 and L9 form part of the first set; lines L2, L6 and L10 form part of the second set; lines L3, L7 and L11 form part of the third set; and, lines L4, L8 and L12 form part of the fourth set. For ease of representation, each of the lines in the figure has been represented using a different dashed line type depending upon its set, i.e. lines belonging to a given set are illustrated using a common line type which is different to the line types used to represent the lines of the remaining sets.

The contone print data is then halftoned by the colour pixel processing unit 72, which may be the same as that described with reference to the first embodiment. As is stated above, the colour pixel processing unit 72 may simultaneously halftone four colour raster planes of contone data, for example black, cyan, magenta and yellow planes. However, in the present embodiment, the colour pixel processing unit 72 is arranged to simultaneously halftone four separate sets of monochrome contone data. In the present embodiment, the colour pixel processing unit 72 is arranged to simultaneously halftone the four logical sets of contone data, as schematically illustrated in page 76b.

Therefore, in the process of the present embodiment each of the four sets of monochrome contone print data L1, L5, L9; L2, L6, L10; L3, L7, L11; and L4, L8, L12 are halftoned simultaneously. Thus, the first set of monochrome contone print data L1, L5, L9 could be viewed as being halftoned as if it formed part of one of the colour raster planes of a given colour image; for example the cyan (C) plane. Continuing with this analogy, the second set of monochrome contone print data L2, L6, L10 could be viewed as being halftoned as if it formed part of a second colour raster plane of the given colour image; for example the magenta (M) plane. Similarly, the third and fourth sets of monochrome contone print data L3, L7, L11 and L4, L8, L12, respectively, could be viewed as being halftoned as if they formed part of the remaining two colour raster planes of the given colour image; for example the yellow (Y) plane and black (K) plane, respectively. However, it will be understood that whilst each colour raster plane of a given colour image generally lies superimposed with the remaining colour raster planes of the image, the separate sets of monochrome contone print data in the present embodiment occupy different areas of the page 76b, as is illustrated in FIG. 5.

The colour pixel processing unit 72 halftones the four sets of monochrome contone print data substantially simultaneously to allow the printed page 76c, corresponding to the contone data page 76a, to be generated significantly faster than previously possible using prior art systems.

The process of the second embodiment will now be described in more detail with reference to FIGS. 6a–c.

Figure 6A:
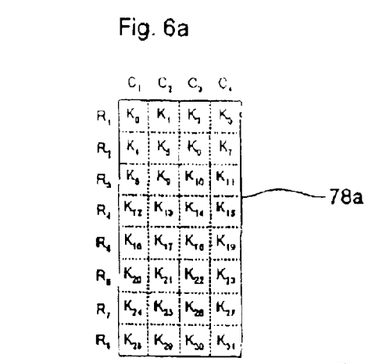
FIGS. 6a–c schematically illustrate the halftoning process of a second embodiment of the invention.

FIG. 6a schematically illustrates a page 78a of contone monochrome print data. As was discussed above with reference to FIG. 3a, adjacent contone values belonging to the same page are conventionally stored in contiguous memory addresses. For ease of explanation in this illustrative example, the individual contone values $K_{40}$ to $K_{431}$ making up the page of contone data 78a are illustrated in positions corresponding to the positions in which they should be printed on a page or a sheet of print media. Thus, as can be seen from the figure, the exemplary page 78 has a width of 4 pixels and a height of 8 pixels, i.e. it has four pixel columns labelled $C_1$–$C_4$ and 8 pixel rows labelled $R_1$–$R_8$. It will be understood that the rows $R_1$–$R_8$ of data of the page 78a may be viewed as equivalent to the lines of data L1–L8 of page 76a of FIG. 5. In the present embodiment, the values $K_0$ to $K_{31}$ are each of 8 data bits and are numbered sequentially left to right and then top to bottom across the page 78a.

In a similar manner to that described with respect to the first embodiment, the colour pixel processing unit 72 reorders the contone values $K_0$ to $K_{31}$ prior to halftoning the contone data of page 78a. The reordering process of the present embodiment will now be described with reference to FIG. 6b, which schematically illustrates the contiguous memory locations 78b holding the reordered contone values $K_0$ to $K_{31}$.

Figures 6B, 6C:
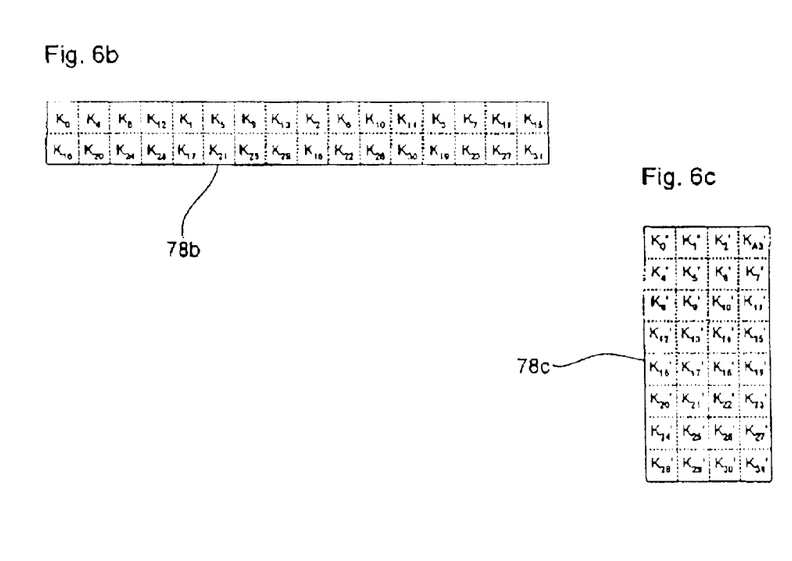

As can be seen from FIG. 6b, the reordered contone data is arranged such that the first four positions in the reordered data hold the values $K_0$, $K_4$, $K_8$ and $K_{12}$. These are respectively the values held at the rows 1 to 4 of column 1 of page 78a, (i.e. the values that were held respectively at locations ($R_1$, $C_1$), ($R_2$, $C_1$), ($R_3$, $C_1$) and ($R_4$, $C_1$) of the page 78a). The contone values $K_1$, $K_5$, $K_9$ and $K_{13}$, which correspond to the values held at the rows 1 to 4 respectively of column 2 of page 78a, (i.e. locations ($R_1$, $C_2$), ($R_2$, $C_2$), ($R_3$, $C_2$) and ($R_4$, $C_2$) of the page 78a) are then stored in the $5^{th}$ through to the $8^{th}$ memory positions in the reordered data. Thus, the value $K_1$ is stored in a memory location adjacent to that of the value of the value $K_{12}$. The values located in column $C_3$, rows $R_1$–$R_4$ are then reordered in the same manner; followed by the values located in column $C_4$, rows $R_1$–$R_4$.

Thus, as can be seen from FIG. 6b, the first 16 contiguous memory addresses of the reordered contone values hold the following values:

$K_0$, $K_4$, $K_8$, $K_{12}$, $K_1$, $K_5$, $K_9$, $K_{13}$, $K_2$, $K_6$, $K_{10}$, $K_{14}$, $K_3$, $K_7$, $K_{11}$ and $K_{15}$ Once all of the contone values of the first four rows of the page 78a have been reordered, the reordering process is continued in the same manner for all of the contone values from the second group of four rows $R_5$–$R_8$, of page 78a. Again, this starts with column $C_1$ and finishes with last column, column $C_4$. Thus, the contone values $K_{16}$, $K_{20}$, $K_{24}$ and $K_{28}$, which correspond to the values held at rows 5 to 8 respectively of column 1 are then stored in the $17^{th}$ through to the $20^{th}$ memory positions in the reordered data. In the figure, the contone values $K_{16}$, $K_{20}$, $K_{24}$ and $K_{28}$ are shown as being on a separate line from the values occupying the first 16 contiguous memory addresses, however, this is merely for ease of representation. As can be seen from FIG. 6b, the $17^{th}$ through to the $31^{st}$ contiguous memory addresses of the reordered contone values hold the following values:

$K_{16}$, $K_{20}$, $K_{24}$, $K_{28}$, $K_{17}$, $K_{21}$, $K_{25}$, $K_{29}$, $K_{18}$, $K_{22}$, $K_{26}$, $K_{30}$, $K_{19}$, $K_{23}$, $K_{27}$, $K_{31}$

The skilled reader will appreciate that in the event that the page 78a had a differing number of rows, the reordering process may be continued until all of the contone values of the page are reordered. It will be understood that this may be the case, even if the number of rows is not divisible by the number of (colour) planes which the halftoning processor is arranged to simultaneously halftone. In such a case, a number of blank rows may be inserted. This number may be chosen so as to make the total number of rows divisible by the number of (colour) planes which the halftoning processor is arranged to simultaneously halftone.

The reordered contone data is then read by the pixel processing unit 72 for halftoning. The contone data values are read by the pixel processing unit 72 for halftoning in the sequence shown in FIG. 6b in 32 bit words. This is carried out in the same manner was described with reference to the first embodiment. Thus, the first 32 bit contone data word to be read is $K_0$ $K_4$ $K_8$ $K_{12}$. This corresponds to the values occupying the first four contiguous memory addresses holding the reordered contone data, as is shown in FIG. 6b.

Each of the four individual 8 bit values $K_0$, $K_4$, $K_8$ and $K_{12}$ making up the 32 bit word are halftoned by the four individual halftone processors of the pixel processing unit 72, simultaneously with and separately from the other three 8 bit values of the same 32 bit word. This gives rise to the following halftone values $K_0'$, $K_4'$, $K_8'$ and $K_{12}'$, which respectively correspond to the contone values $K_0$, $K_4$, $K_8$ and $K_{12}$.

It will be noted that the values $K_0$, $K_4$, $K_8$ and $K_{12}$ originate from different rows of the page 78a; $R_1$–$R_4$ respectively. Therefore, it is preferable to use a non-row dependant halftoning process, which avoids introducing interdependency between the separate values $K_0$, $K_4$, $K_8$ and $K_{12}$. Thus, a conventional colour halftoning method may be used to implement the present embodiment; for example, using a dither or matrix based method, or other suitable method that does not introduce such interdependency. However, as the skilled reader will appreciate, in the case of monochrome printing, especially in the case of printing monochrome text, this is not a significant limitation.

The halftone values $K_0'$, $K_4'$, $K_8'$ and $K_{12}'$ are then stored in planar format in a single plane. This is in contrast to the method of the first embodiment and conventional colour halftoning processes in which the halftone data is output to multiple planes. This is because the contone data values of the present embodiment $K_0$–$K_{31}$ belong to different portions of the same monochrome page 78. Thus, the values are not superimposed on the page, as would be the case with different colour planes. Consequently, it is convenient and so preferable in the present embodiment to store the halftone data for a given page in the same plane.

Due to the reordering step described above, the halftone values, e.g. $K_0'$, $K_4'$, $K_8'$ and $K_{12}'$, are generated in an order corresponding to the reordered contone values as shown in FIG. 6b and not the original order as shown in FIG. 6a. Therefore, in the present embodiment, when the halftone values, e.g. $K_0'$, $K_4'$, $K_8'$ and $K_{12}'$ are stored in planar format, they are stored such that they have the same order in contiguous memory addresses as the corresponding contone values illustrated in FIG. 6a. In this manner, the integrity of the image is maintained when it is printed, without requiring any modifications to be made to the method in which halftone data is retrieved for printing. As is well understood in the art of halftoning in inkjet systems, firmware may be used to calculate absolute memory addresses in which to save the generated halftone data. Generally, each colour pane of a conventional colour system has an output pointer. These pointers "point" to the addresses in which the next halftone data is to be stored. The pointers are then generally incremented according to a process controlled in firmware. In the present embodiment, each pointer is arranged to point to the same output plane at a given moment in time. However, in the present embodiment the pointers ensure that the individual halftone values are stored in planar format in the same relative position as that in which the corresponding individual contone values of page were stored. Thus, for example, the halftone values $K_0'$, $K_4'$, $K_8'$ and $K_{12}'$, are stored in positions column 1, rows 1 to 4 respectively of the output plane 78c. In the present embodiment, this process is controlled by the firmware. Such techniques are well understood in the art and therefore will not be discussed further here.

The colour pixel processing unit 72 subsequently reads in the next 32 bit contone data word in the sequence shown in FIG. 6b (i.e. $K_1$, $K_5$, $K_9$, $K_{13}$). This data is then halftoned and stored as was described above with respect to the first 32 bit contone data word.

The halftoning process of the present embodiment continues, processing the 32 bit contone data words in sequence, until each of the remaining 32 bit contone data words illustrated in FIG. 6b is similarly processed and halftone values $K_0'$–$K_{31}'$, corresponding respectively to contone values $K_0$–$K_{31}$ have been generated and stored.

FIG. 6c, schematically illustrates the halftone data values $K_0'$–$K_{31}'$ stored as a page 78c in planar format. Again for ease of explanation the halftone data values $K_0'$–$K_{31}'$ are illustrated in positions corresponding to the positions in which they will be printed on a page or a sheet of print media. Thus, it can be seen that the halftone values $K_0'$–$K_{31}'$ are stored in page 78c in an order which corresponds to the order in which the contone values $K_0$–$K_{31}$ occupied in the page of contone data 78a; thus the integrity of the halftone page 78c is ensured relative to the contone page 78a.

It will be noted that the contone values of each row $R_1$–$R_4$ or $R_5$–$R_8$ etc., in the present embodiment, occupy a given position in the associated 32 bit words, as a result of the reordering process described above. For example, the contone values $K_0$, $K_4$, $K_8$, $K_{12}$ making up the first row $R_1$ of page 78a are stored in memory locations 78b such that they each form the first 8 bits of their 32 bit words when read for halftoning. In this way, each row (e.g. $R_1$–$R_4$) is halftoned by a given one of the four halftone processors or circuits of the pixel processing unit 72. This allows spatially separate rows (e.g. $R_1$–$R_4$) of contone data to be halftoned as if they were different colour components of the same contone data row, as explained above. It will thus be apparent to the skilled reader that in the process of the present embodiment the colour pixel processing unit 72 effectively halftones a contone page in groups of 4 lines of contone data, where the lines of a given group are halftoned simultaneously.

By using the four halftone processors of the pixel processing unit 72 to halftone monochrome data in parallel, the method of the present embodiment may yield a halftoning throughput increase of up to a factor of 4 relative to prior art techniques which may process only a single line of monochrome halftone data at a time.

This method of the present embodiment offers the advantage over the first embodiment in that it may be applied with benefit to print jobs of fewer pages. For example, the process of the second embodiment may be implemented using a single page. Thus, the latency of a system according to the second embodiment may be reduced relative to that of the first embodiment. By this it is meant that the processing of the halftone data, required in order to allow printing to start, may be initiated as soon as the first four lines (for example) are generated, as opposed to having to wait for four or more complete pages (for example) to be halftoned. In turn, this gives rise to the corollary advantage of requiring less memory in order to carry out the required processing and so allowing the memory requirements for the system to be reduced.

As was the case in the first embodiment, the process of the second embodiment is also transparent to the halftoning process. Again this gives rise to the advantages of being able to utilize existing colour halftoning methods and hardware in the present embodiment without requiring significant modification.

It will be understood that the present embodiment may be operated to allow images of a given resolution to be halftoned faster than is possible using prior art methods, as described above. Alternatively, however, the increased processing speed of the present embodiment may be used to allow images of increased resolution to be processed for a given throughput. Thus, in the case of the present embodiment, where a four-fold increase in throughput may be realised for an image of a given resolution, instead an image of the same size but four times the resolution may be halftoned whilst preserving the given throughput. In the case of printing or copying text, for example, where high levels of resolution are usually required, this may be a significant advantage. Furthermore, any other suitable trade-off between resolution and throughput may be selected; for example images or pages of twice the normal resolution may be haftoned at twice the normal throughput.

It will also be understood that the present embodiment may be implemented using a pixel processing unit 72 that is arranged to simultaneously process a different number of planes to four, as was described in the present embodiment. For example, six plane systems arranged to simultaneously halftone black, cyan, magenta, yellow, light cyan and light magenta colour planes may be implemented. Alternatively systems having two, three, five, seven or eight (or indeed more) colours may also be used. In such cases, it will be clear to the skilled reader that the present embodiment may be adapted to take advantage of the level of parallel halftone processing power provided by the halftone processor in question. This may be done by adjusting the number of lines of monochrome data which are simultaneously halftoned to equal the number of separate colour planes which the halftone processor is arranged to handle.

However, it will also be apparent to the skilled reader that the present embodiment may also be modified such that the number of lines of monochrome data which are simultaneously halftoned are less than the number of separate colour planes which the halftone processor is arranged to handle. For example, such a modified embodiment may use a halftone processor arranged to simultaneously halftone four separate colour planes but limit the number of lines of monochrome contone data to be halftoned to less than four; for example two or three lines.

Although in the above-described embodiment the individual interleaved lines of a contone image are halftoned independently by the four halftone processors of the pixel processing unit 72, the skilled reader will realise that in practice, this may be varied. For example, a group of adjacent lines could be halftoned by a given halftone processor. Furthermore, each line could be divided such that different sections of the line are halftoned by different halftone processors. However, the skilled reader will understand that the order in which data is processed in a halftoning method will to a certain degree affect the efficiency of the halftoning process. For example, it is desirable to carefully regulate the number or frequency and locations of memory access (read/write) operations in order to ensure that the system operates efficiently. In this regard, the reordering process described in the present embodiment, in combination with a given row of contone data being processed by a given halftoning processor has been found to provide for a particularly efficient halftoning process.

Further Embodiments

In the above description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In practice, the skilled reader will appreciate that in order to implement the method of the above described embodiments it is not necessary to reorder the contone print data prior to halftoning. However, doing so may allow for the faster accessing of memory when it comes to reading the information for halftoning. Additionally, since it is often possible to implement such a reordering step during a required preliminary data processing step, and in so doing incurring no significant time penalty, it is generally preferable to reorder the data. An example of a conventional preliminary data processing step during which the reordering process may be implemented is that of data compression.

The skilled reader will also appreciate that the above-described embodiments may be combined in a given printing system according to the present invention. For example, such a printing system may be configured to implement either the first or the second embodiment in dependence upon a conventional user input. Furthermore, such a printing system, or one arranged to implement only one of the first and second embodiments, may also be arranged to print in colour or black and white, using a conventional halftoning process.

As will be apparent to the skilled reader that although the halftoning processes of the above-described embodiments are described as being implemented by a processor associated with a printer, it will be understood by the skilled reader that in other embodiments, such halftoning processes may instead be carried out by hardware external to the printer.

Although the above-described embodiments were described with reference to a colour printer arranged to halftone monochrome images at an increase throughput, it will be appreciated that in other embodiments, images having two or more colours may be halftoned at higher throughputs. For example, the methods of the above-described embodiments may be used to halftone a two colour image twice as fast as a four colour image would conventionally be done processed. In such an embodiment, the colour data corresponding to each of the colours of the two colour image may be halftoned by a different two of the four halftone processors of the colour pixel processing unit. In a similar manner, for example, in an eight colour system, a four colour image may be halftoned at twice the throughput relative to an eight colour image.

Furthermore, it will be apparent to the skilled reader that the methods of the above described embodiments allow various processes, commonly applied to images during the halftoning process, to be implemented on images processed in accordance with the embodiments; for example: super-pixelling and edge enhancement processes.

Although the above-described embodiments were described with reference to ink jet printers, it will be appreciated that they may also be applied to other digital printer technologies.

What is claimed is:

1. A method of halftoning monochrome contone image data with a colour pixel processor, said processor having a plurality of processing channels, each to halftone substantially simultaneously image data corresponding to a respective one of a plurality of different colours, said method comprising the steps of:
providing monochrome image data to each processing channel, the image data in each channel corresponding to a different pixel position of a print job, the pixel positions selected in accordance with a selected halftoning method to substantially avoid halftone interdependencies between the image data corresponding to the different pixel positions; and
applying the selected halftoning method to halftone the monochrome image data in each of the processing channels substantially simultaneously.

2. A method according to claim 1, wherein in said halftoning step said plurality of separate pixel positions is less than or equal to said plurality of different colours.

3. A method according to claim 2, wherein said plurality of separate pixel positions are located on a common page of monochrome contone data.

4. A method according to claim 3, wherein said step of halftoning is carried out using a non-row dependent or a matrix based halftoning process.

5. A method according to claim 3, further comprising the step of storing halftone data corresponding to said plurality of separate pixel positions in planar format in a common plane.

6. A method according to claim 3, wherein said pixel processor comprises a plurality of halftone processors corresponding to said plurality of colours, further comprising the step of reordering said monochrome contone image data prior to said step of halftoning such that each one of a plurality of groups of contone image data is halftoned by a predetermined halftone processor.

7. A method according to claim 6, wherein each of said plurality of groups of contone image data comprises one or more lines of contone image data.

8. A method according to claim 6, wherein said reordering step is carried out during a further data processing step, such as data compression, prior to said step of halftoning.

9. A method according to claim 3, further comprising the step, prior to said step of halftoning, of selecting said halftoning method according to claim 3.

10. A method according to claim 9, wherein said step of selecting is made by an operator input.

11. A method according to claim 9, wherein said step of selecting is made automatically in dependence upon the number of pages of monochrome contone image data to be printed or another criterion.

12. A method according to claim 2, wherein said plurality of separate pixel positions are located on a plurality of separate pages of monochrome contone data.

13. A method according to claim 12, wherein said step of halftoning is carried out using a non-plane dependent halftoning process.

14. A method according to claim 12, further comprising the step of storing halftone data corresponding to said plurality of separate pixel positions in planar format, in a plurality of separate planes corresponding to said plurality of separate pages.

15. A method according to claim 12, wherein said pixel processor comprises a plurality of halftone processors corresponding to said plurality of colours, further comprising the step of reordering said monochrome contone image data prior to said step of halftoning such that each one of a plurality of groups of contone image data is halftoned by a predetermined halftone processor.

16. A method according to claim 15, wherein each of said plurality of groups of contone image data comprise one or more pages of contone image data.

17. A method according to claim 15, wherein said reordering step is carried out during a further data processing step, such as data compression, prior to said step of halftoning.

18. A method according to claims 12, further comprising the step, prior to said step of halftoning, of selecting said halftoning method according to according to claim 12.

19. A method according to claim 18, wherein said step of selecting is made by an operator input.

20. A method according to claim 18, wherein said step of selecting is made automatically in dependence upon the number of pages of monochrome contone image data to be printed or another criterion.

21. A method according to claim 1, wherein the step of halftoning is carried out by a processor associated with an inkjet printer system.

22. A method according to claim 1, further comprising the step of printing said halftone data with an inkjet printer system.

23. A computer program comprising program code means for performing the method steps of claim 1 to halftone substantially simultaneously a plurality of monochrome image data corresponding to a plurality of separate pixel positions of a print job when said program is run on a processing means associated with a suitable printer system.

24. A printer system including:
a colour pixel processor, said processor being arranged to halftone substantially simultaneously a plurality of image data corresponding to a plurality of different colours said processor being further arranged to halftone substantially simultaneously a plurality of monochrome image data corresponding to a plurality of separate pixel positions of a print job.

25. A system according to claim 24 comprising an inkjet printer device.

26. A printer device arranged to print images using a plurality of colours in a first print mode and to print images using a reduced number of colours in a second print mode, the device being arranged to halftone a first colour belonging to the set of the reduced number of colours at a first speed in the first printing mode and at a second speed, faster than the first speed in the second mode.

27. A method of halftoning monochrome contone image data, said method comprising:
(a) providing at least one colour pixel processor arranged to halftone substantially simultaneously a plurality of image data corresponding to a plurality of different colours; and
(b) using said at least one colour pixel processor to halftone substantially simultaneously a plurality of monochrome image data corresponding to a plurality of separate pixel positions of a print job.

28. A method according to claim 27, wherein said plurality of separate pixel positions is less than or equal to said plurality of different colours.

29. A method according to claim 27, wherein said pixel processor comprises a plurality of halftone processors corresponding to said plurality of colours, further comprising reordering said monochrome contone image data prior to halftoning such that each one of a plurality of groups of contone image data is halftoned by a predetermined halftone processor.

30. A method according to claim 29, wherein each of said plurality of groups of contone image data comprises one or more lines of contone image data.

31. A method according to claim 29, wherein said reordering is carried out during further data processing, such as data compression, prior to halftoning.

32. A method according to claim 27, wherein said pixel processor comprises a plurality of halftone processors corresponding to said plurality of colours, further comprising reordering said monochrome contone image data prior to halftoning such that each one of a plurality of groups of contone image data is halftoned by a predetermined halftone processor.

33. A computer program comprising program code means for performing the method steps of claim 27 to use at least one colour pixel processor to halftone substantially simultaneously a plurality of monochrome image data corresponding to a plurality of separate pixel positions of a print job when said program is run on a processing means associated with a suitable printer system.

34. A method of halftoning monochrome contone image data with a colour pixel processor, said processor having a plurality of processing channels, each to halftone substantially simultaneously image data corresponding to a respective one of a plurality of different colours, said method comprising the steps of:

providing monochrome image data to each processing channel, the image data in each channel corresponding to a different pixel position of a print job; and halftoning the monochrome image data in each of the processing channels substantially simultaneously so as to generate substantially more halftone pixel values than when halftoning colour image data.

35. A method according to claim 34, wherein the generation of halftone pixel values when halftoning monochrome image data is approximately an integer multiple value higher than when halftoning colour image data.

36. A printing system, comprising:

a colour pixel processor having a plurality of processing channels, each to halftone substantially simultaneously image data corresponding to a respective one of a plurality of different colours;

a controller for selecting different pixel positions in a print job in accordance with a preprogrammed halftoning method to substantially avoid halftone interdependencies between image data corresponding to the different pixel positions, for providing monochrome image data corresponding to a different pixel position to each processing channel, and for applying the halftoning method to halftone the monochrome image data in each of the processing channels substantially simultaneously; and a printing mechanism to print halftoned image data provided by the controller.

37. A printing system, comprising:

a colour pixel processor having a plurality of processing channels, each to halftone substantially simultaneously image data corresponding to a respective one of a plurality of different colours;

a controller for providing monochrome image data corresponding to a different pixel position of a print job to each processing channel, and for halftoning the monochrome image data in each of the processing channels substantially simultaneously so as to generate substantially more halftone pixel values than when halftoning colour image data; and a printing mechanism to print halftoned image data provided by the controller.

\* \* \* \* \*

UNITED STATES PATENT AND TRADEMARK OFFICE
CERTIFICATE OF CORRECTION

PATENT NO.       : 7,086,712 B2
APPLICATION NO.  : 10/209333
DATED            : August 8, 2006
INVENTOR(S)      : Lluis Abello It is certified that error appears in the above-identified patent and that said Letters Patent is hereby corrected as shown below:

On the title page, item (73), in "Assignee", in column 1, line 2, delete "L.P" and insert -- L.P. --, therefor.

In column 16, line 20, in Claim 18, delete "claims" and insert -- claim --, therefor.

In column 16, line 22, in Claim 18, after "according to" delete "according to".

In column 16, line 45, in Claim 24, after "colours" insert -- , --.

Signed and Sealed this

Tenth Day of February, 2009

JOHN DOLL
*Acting Director of the United States Patent and Trademark Office*